Nov. 9, 1948.   R. G. PIETY   2,453,456
INSTRUMENT FOR MEASURING WATER FLOW IN WELLS
Filed March 7, 1945
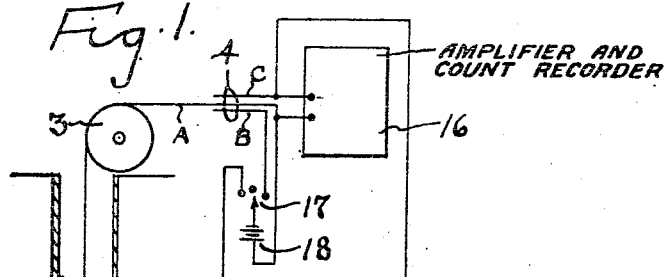
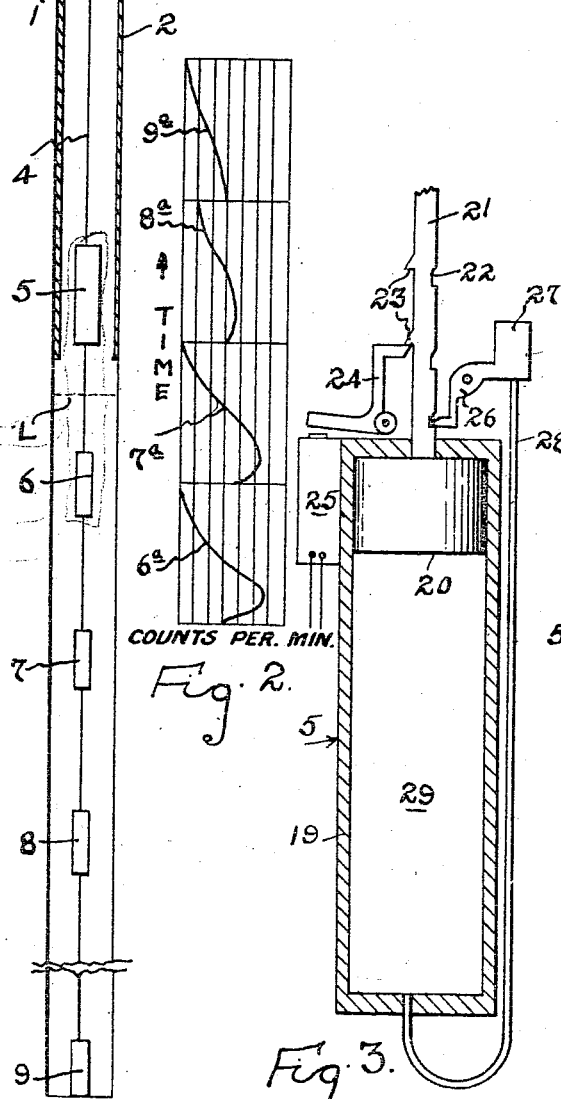
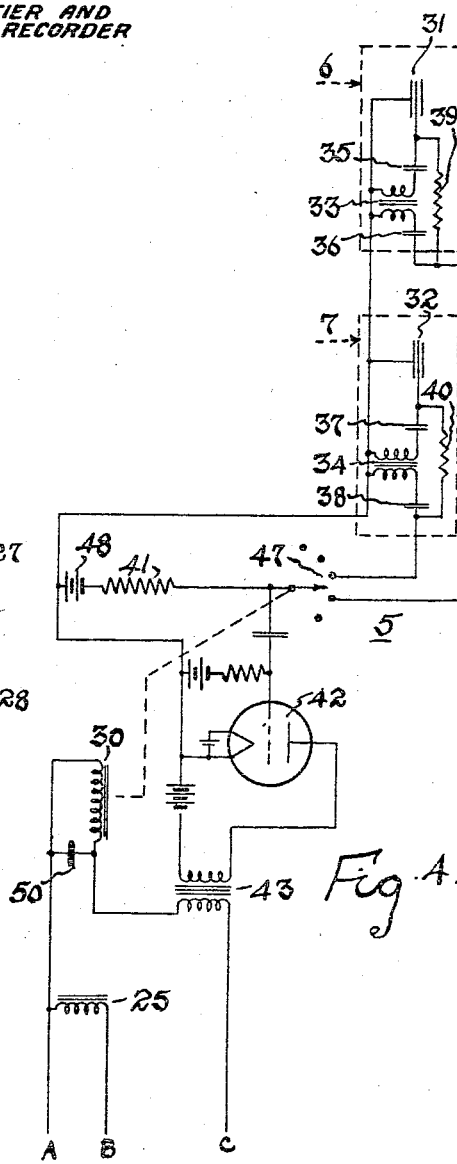
INVENTOR.
Raymond G. Piety.
BY Darby & Darby
Att'ys.

Patented Nov. 9, 1948

2,453,456

UNITED STATES PATENT OFFICE 2,453,456

INSTRUMENT FOR MEASURING WATER FLOW IN WELLS

Raymond G. Piety, Tuckahoe, N. Y., assignor to Phillips Petroleum Company, a corporation of Delaware Application March 7, 1945, Serial No. 581,471

9 Claims. (Cl. 250—83.3)

This invention relates to an instrument or apparatus for determining the time of arrival of a radioactive sample at various depths in a water input well.

An object of this invention is to provide apparatus for furnishing information for the distribution of the input water flowing into a water flood formation.

In the past measurements of this type have been made by setting bores at various depths in the well to determine section by section the pressure required to force a given amount of water into the packed off portion of the well. This operation is expensive and difficult to carry out effectively. In spite of the fact that it is of considerable importance to know just which formations are taking water and the rate at which they are taking it, no method which is effective and apparatus at a reasonable cost, is available other than that disclosed in my copending application Serial No. 446,680, filed June 11, 1942, for "Well Surveying," now Patent No. 2,385,378. This invention which relates to and employs the method of that application provides a simple and easily operated apparatus by means of which the method of the above application may be carried out in the field, and in some cases carried out more effectively than by the apparatus disclosed therein.

Like the apparatus and method of the above application, this invention is concerned with an apparatus including Geiger counters sensitive to gamma rays. In accordance with this invention, a number of such counters are suspended in the well in spaced relation along a portion thereof to be explored and held fixed in place during the taking of a set of readings. A sample of radioactive material is injected into the fluid in the well, usually water, at a fixed point above the first counter, and the arrival time of the sample at each of the counters in the string is recorded. From this information the average flow rate of input water between counter stations can be calculated. If the well bore is of constant average diameter and the factor which converts the peak velocity to the average velocity of movement of the sample for a tube of the nature of a bore hole is known, the amount of water taken in the various sections of the bore hole can be estimated with reasonable accuracy.

These results follow from the fact that the average velocity of flow of a fluid in a pipe is equal to the quantity of fluid passing a given point divided by the area, and that for each degree of turbulence in the fluid body there is a factor which converts average velocity to peak velocity for incompressible viscous fluids such as water under the conditions in the bore hole. The factor which converts the average velocity to peak velocity varies from no turbulence to extreme turbulence. In many cases the amount of water taken by a small section of the well is so high that the desired information can be obtained without any knowledge of the degree of turbulence. The existence of turbulence can be estimated from the Reynolds number. It has been established that for distances of the order of fifty feet that the arrival time of a radioactive sample can be determined quite easily with an error of the order of only a few percent. For larger distances it is desirable to inject a new radioactive sample at the beginning of the next fifty feet of distance.

In making a survey by this method, one satisfactory procedure is to lower the string of detectors to the bottom of the well which, for example in the case of a 50 foot string, would be the lowermost 50 foot section of the well bore. A radioactive sample is then released into the fluid of the well bore just above the string and successive readings of the counter responses from the uppermost counter to the bottom of the well are taken. The string is then raised to the next uppermost 50 foot section of the well bore and another radioactive sample injected into the well bore fluid and readings taken as before. This procedure is followed until the desired number of succeeding higher 50 foot sections have been explored.

The injection of more than one radioactive sample is made desirable, if not necessary, by reason of the unequal leaching by successive formation strata. Thus the effect of one formation taking more fluid, that is water, to rapidly deplete the concentration of radioactive material is compensated for by exploring the well bore in sections at the upper end of each of which a new radioactive injection is made.

The factor of turbulence is minimized in accordance with the apparatus disclosed in this invention by employing fixed counters as distinguished from the form of the invention disclosed in my above mentioned application where the counters are in motion during use, or are moved back and forth through the fluid in the well between readings. Such movement of the counters increases turbulence and destroys the distribution of the radioactive sample in the well fluid so as to introduce errors in the subsequent readings.

In addition to the advantages and objects of the invention as outlined above, it will be apparent from the following description that other advantages are obtained. Since, as will be apparent from the disclosure as it proceeds that the subject matter of the invention as claimed is subject to variation without departure from the essence of the disclosure, I do not desire to be limited by it, but rather by the appended claims when properly interpreted in the light of the disclosure in the prior art.

This invention resides substantially in the combination, construction, arrangement and relative location of parts, all as will be described in detail below.

Referring to the drawings,

Figure 1 is a diagrammatic illustration of a vertical, cross-sectional view through a water input well or bore hole generally diagrammatically illustrating the apparatus of the invention and its association with the well when in use;

Figure 2 is a chart produced by the counters, indicating the readings for one sample taken at four successive counters;

Figure 3 is a vertical, central, cross-sectional view with some parts in elevation of a mechanism for releasing a sample into the well fluid;

Figure 4 is a circuit diagram of the apparatus of the invention.

Referring to Figure 1, the well to be tested is indicated at 2. Suspended in the well on the cable 4, is the instrument barrel and radioactive sample ejector 5, and a series of vertically spaced Geiger counters 6, 7, 8 and 9. It is to be understood that the number of counters shown in the drawings is merely illustrative, and that the string thereof need not necessarily extend to the bottom of the well, since a string of several counters covering a predetermined length section of the well could be successively moved to succeeding lower or higher length sections until all of the uncased portion of the bore or any subunit thereof has been tested. In the case where a string of counters is employed extending throughout the full length of the encased portion of the bore, it is preferable to position the instrument barrel and sample ejector 5 adjacent the lower end of the casing 1.

The use of this apparatus will be described briefly before referring in detail to the construction of the parts thereof. It is assumed that the well bore is filled with some fluid, which is commonly water for this purpose, to the level L and that additional water is being added to the well at its opening at the surface of the ground at a sufficient rate to maintain the well fluid at that level. A sample of radioactive material dissolved in water is injected or discharged into the well fluid by sending a controlling pulse of electric current through a circuit wire in the cable 4 to actuate the chamber in the instrument barrel 5. Since the water is flowing out of the well through one or more formations the sample will travel downwardly and when it reaches the first counter 6 an indication of its arrival will result from the actuation of that counter. A record of the number of counts can be made in accordance with well known practice on a moving chart like that illustrated in Figure 2, comprising a strip of suitable recording material on which a graph 6a is traced, indicating the number of counts or relative intensity of the radioactive sample when in the region of the counter 6, as well as indicating graphically the speed of movement of the sample, by the slope thereof. Graphs 7a, 8a and 9a give similar indications for the arrival of the same sample at the counters 7, 8 and 9. It will be noted that the number of counts or strength of the sample is gradually decreasing with the passage of time, that is as the sample travels downwardly to the bottom of the well, and that the slope of the graphs gradually decreases indicating the loss of fluid and with it a portion of the radioactive sample.

Assuming that the counters are strung throughout the enclosed portion of the well, all sections thereof can thus be tested. It is apparent that if desired a fewer number of counters may be employed in the string and starting from either the top or the bottom of the encased portion of the well the string may be lowered or raised in successive steps to explore all or any desired length of the well bore. In some cases it may be desirable to tie in the data recorded from each pair of adjacent sections by positioning the string so as to get an overlapping of the areas tested. An important point to note is that the counters are stationary during the taking of readings, reducing to a minimum within the possibilities of the process, turbulence of the well fluid, and hence reducing undesired disturbance and distribution of the sample in the well fluid.

Of course, if desired, a preliminary run throughout the well bore or desired sectional length thereof may be made to determine the natural radio activity of the bore, as disclosed in my above mentioned application, and for similar purposes.

In Figures 3 and 4 there is disclosed in more detail one form of apparatus suitable to this procedure. The radioactive sample ejector is shown in detail in Figure 3. First it may be noted, however, that a material suitable for this purpose is radon dissolved in water. This solution is filled into the space 29 formed by the cylinder 19 in which a sufficiently heavy piston 20 is slidably mounted. The solution may consist of ⅕ millicurie of radon per ounce of water used. The ejector may be designed so as to discharge about one ounce of this solution per sample. The piston 20 is provided with a piston rod 21 which has a series of notches 22 on one side and a series of projections 23 on the other side. At the start of the operation the piston is in its fully raised position, as shown in Figure 3, and is held there by means of a pivotally mounted latch member 24 which engages the lowermost projection 23. The latch member 24 may be moved to releasing position by means of a magnet 25 so that the piston 20 may move downwardly to force a predetermined quantity of the solution from the cylinder 19. In order to insure the discharge of equal volumes of the sample solution a pivotally mounter lever 26 is positioned so that a projection thereon may engage successively in the notches 22 as the piston rod descends. The lever 26 is provided with a weighted head 27 forming a valve which normally closes the discharge end of a pipe 28, communicating with the space 29 within the cylinder 19. When the piston 20 and its rod 21 descend one step the lever 26 will be cammed out of the adjacent notch 22 to cause counterclockwise rotation of the lever and open the valve so that the downward movement of the piston 20 will discharge the sample solution from the end of pipe 28 into the well bore. Magnet 25 is only momentarily energized so that lever 24 properly spring biased if necessary will return to normal position, as shown in Figure 6, after releasing the piston 20 so as to engage the next notch 23, by which time the full sample has been discharged from the pipe 28 so that when the projection on lever 26 enters the next notch the end of the pipe 28 will be closed. By proper spacing of the notches 22 and projections 23 any desired size of radioactive sample can be discharged. These samples may all be of the same or of different sizes as desired or conditions dictate. This ejector forms part of the instrument barrel 5 and it is controlled from the surface of the ground.

Figure 4 diagrammatically illustrates the remainder of the apparatus concerned with this invention and included within the instrument barrel 5. Two of the Geiger counters and associated apparatus are diagrammatically illustrated at 6 and 7 in Figure 4. This includes the counters 31 and 32 respectively and associated apparatus, including coupling transformers 33 and 34 and the condensers 35 and 36, and 37 and 38 which separate the direct potential of the current source 48 from the transient pulses produced when the counters are actuated. The resistors 39 and 40 serve to place the proper high positive potential on the collector wires of the counters, all in accordance with well known practice in that art. The pulses from the counters are applied through a sequence switch 47 and generate a voltage across the resistance 41 which is applied to the input of the amplifier tube 42 and its associated circuits and transmitted thereby through the transformer 43 to the ground surface over the conductors A and B. The sequence switch 47 is operated by an electromagnet 30, as indicated by the broken line in Figure 4. The magnet 30 is in circuit with the secondary of the transformer 43 and can be energized over the wires A and C. Each time the magnet 30 is energized the sequence switch 47 is operated one step so that the Geiger counters are successively connected to the input of the amplifier 42. Electromagnetically operated sequence switches of this type are well known in many forms and further illustration thereof is not desirable. Likewise, it is believed that the illustration of the Geiger counters, the amplifier and associated circuits is sufficient in view of the fact that all these apparatus elements are on the market as amplifier products today. It is noted that the sample ejector operating magnet 25 employs the circuit wire A as one of its circuit wires, and that a separate circuit wire B is provided for it.

The wires A, B and C form the cable 4, or are incorporated in it and extend to the surface of the ground where the amplifier and the recorder for producing the charts of Figure 2 are situated. The wire B extends to the control switch 17. Wire C which goes to the input of the amplifier is connected by a wire to one of the fixed contacts of switch 47 and the common conductor A connects to the other active fixed contact of the switch. The dead middle contact represents the off position of the switch blade. With this circuit arrangement only one extra wire per counter is needed running from the respective counters to the sequence switch 47 in the instrument barrel 5 and only three leads, namely the wires A, B and C need run to the apparatus at the ground level. Thus the wires A and C represent the output leads of the amplifier 42 in the instrument barrel and extend to the input of the amplifier at ground level. The output of the amplifier serves to operate the recorder.

From a study of Figures 1 and 4 it will be apparent that when switch blade 17 is moved to the right, current will flow from the current source 18 through the switch 17, wire B, through the magnet 25 and by wire A back to the other side of the current source. Thus for each momentary closing of switch 17 to the right, magnet 25 will be energized to operate the ejector. On the other hand, each time that the switch blade 17 is moved to the left, current will flow from the current source 18 through switch 17, through the connection to wire C, wire C to the secondary of transformer 43 through the sequence switch magnet 30, and back to the other side of the current source through the wire A. Each time the switch is closed in this position magnet 30 will be energized to progress switch 47 one step to place the next Geiger counter in circuit.

Thus it will be seen that by the proper operation of switch 17 the apparatus may be controlled from the surface of the ground to effect the ejection of radioactive samples as required and to successively energize the Geiger counters. The pulses from the counters are amplified, sent to the surface, further amplified and employed to energize the tape recorder to produce the charts of Figure 2. In order to keep the counter pulses out of the sequence magnet 30 a bypass condenser 50 is provided, the presence of which, of course, does not interfere with the normal operation of this magnet. It does not harm, of course, to have the energizing current for the sequence magnet to pass through the secondary of transformer 43.

What is claimed is:

1. An apparatus for measuring the flow of fluid in a bore hole, comprising means in the bore hole for injecting a radioactive sample into the fluid in the bore hole, a plurality of spaced gamma ray detectors in the bore hole below said injector, means for suspending said injector and detectors in the bore hole in any one of a desired number of fixed positions, and means at the upper end of the bore hole for successively recording the output of said detectors.

2. In the combination of claim 1, electrical means at the upper end of the bore hole for actuating said injector to release a radioactive sample at will.

3. In the combination of claim 1, a circuit from said detectors to the upper end of the bore hole, and a selector controlled from the upper end of the bore hole for successively connecting said detectors to said circuit.

4. In the combination of claim 1, an instrument barrel containing an amplifier, circuits extending from the output of said amplifier to the recording means at the upper end of the bore hole, an input circuit for said amplifier, output circuits for said detectors, and a sequence switch operated from the upper end of the bore hole for successively connecting the ray detector output circuits to the input circuit of the amplifier.

5. In the combination of claim 1, an instrument barrel containing an amplifier, circuits extending from the output of said amplifier to the recording means at the upper end of the bore hole, an input circuit for said amplifier, output circuits for said detectors, a sequence switch operated from the upper end of the bore hole for successively connecting the ray detector output circuits to the input circuit of the amplifier, and means including a circuit controlled from the upper end of the bore hole for actuating said injector.

6. In the combination of claim 1, an instrument barrel containing an amplifier, circuits extending from the output of said amplifier to the recording means at the upper end of the bore hole, an input circuit for said amplifier, output circuits for said detectors, a sequence switch operated from the upper end of the bore hole for successively connecting the ray detector output circuits to the input circuit of the amplifier, and means including a circuit controlled from the upper end of the bore hole for actuating said injector, said injector controlled circuit and the output circuit of said amplifier having a common lead.

7. In the combination of claim 1, an instrument barrel of which said injector is a part, an amplifier in said instrument barrel, the output circuit of said amplifier being connected to the input of said recording means, circuits for said ray detectors, and an electro-magnetically operated switch controlled from the upper end of the bore for selectively connecting the detector circuits to said amplifier.

8. In the combination of claim 1, said injector comprising a container having a gravity actuated piston therein, a valve discharge pipe, and magnetic means controlled from the upper end of the bore hole for actuating said valve.

9. In the combination of claim 1, said injector comprising a container having a gravity actuated piston therein, a valve discharge pipe, means controlled from the upper end of the bore hole for actuating said valve, and means controlled from the upper end of the bore hole for causing stepwise movement of said piston and conjoint operation of said valve to effect the ejection of fluid from said container in predetermined unit quantities.

RAYMOND G. PIETY.

REFERENCES CITED

The following references are of record in the file of this patent:

UNITED STATES PATENTS

| Number    | Name      | Date           |
|-----------|-----------|----------------|
| 2,352,993 | Albertson | July 4, 1944   |
| 2,358,945 | Teichmann | Sept. 26, 1944 |
| 2,370,162 | Hare      | Feb. 27, 1945  |
| 2,385,378 | Piety     | Sept. 25, 1945 |